(12) United States Patent
Lejeune

(10) Patent No.: US 12,291,940 B2
(45) Date of Patent: May 6, 2025

(54) FLOAT VALVE APPARATUS HAVING METAL-TO-METAL SEALS AND METHOD FOR USING SAME

(71) Applicant: B.L. SALES & MANAGEMENT, INC., Lafayette, LA (US)

(72) Inventor: Robert J. Lejeune, Lafayette, LA (US)

(73) Assignee: B.L. SALES & MANAGEMENT, INC., Lafayette, LA (US)

( * ) Notice: Subject to any disclaimer, the term of this patent is extended or adjusted under 35 U.S.C. 154(b) by 0 days.

(21) Appl. No.: 18/650,826

(22) Filed: Apr. 30, 2024

(65) Prior Publication Data

US 2025/0052130 A1 Feb. 13, 2025

Related U.S. Application Data

(60) Provisional application No. 63/518,612, filed on Aug. 10, 2023.

(51) Int. Cl.
*E21B 34/08* (2006.01)
*E21B 21/10* (2006.01)
*F16K 31/20* (2006.01)

(52) U.S. Cl.
CPC .............. *E21B 34/08* (2013.01); *E21B 21/10* (2013.01); *F16K 31/20* (2013.01)

(58) Field of Classification Search
CPC .................................. E21B 34/08; E21B 34/06
See application file for complete search history.

(56) References Cited

U.S. PATENT DOCUMENTS

| 5,117,861 A * | 6/1992 | McConnell | F16K 15/06 |
| | | | 137/515.7 |
| 5,139,085 A * | 8/1992 | Duvallet | E21B 49/082 |
| | | | 166/321 |
| 6,148,920 A | 11/2000 | Mccalvin | |
| 6,494,499 B1 * | 12/2002 | Galle, Sr. | E21B 17/0423 |
| | | | 285/333 |
| 7,188,688 B1 | 3/2007 | Lejeune | |
| 2005/0098210 A1 | 5/2005 | Strattan et al. | |
| 2011/0192608 A1 | 8/2011 | Lejeune | |

OTHER PUBLICATIONS

PCT International Search Report and Written Opinion dated Jun. 25, 2024.

* cited by examiner

*Primary Examiner* — Brad Harcourt
(74) *Attorney, Agent, or Firm* — Ted M. Anthony

(57) ABSTRACT

A float valve assembly has a moveable dart member biased in a normally-closed position in a housing. A baffle strainer member can be operationally attached to the housing using mating thread in order to provide a metal-to-metal fluid pressure seal between the baffle strainer member and the housing. External threads on the baffle strainer member can also mate with internal threads in a central through bore of a tubular carrier sub in order to provide a metal-to-metal fluid pressure seal between the baffle strainer member and the carrier sub.

11 Claims, 12 Drawing Sheets

FLOAT VALVE APPARATUS HAVING METAL-TO-METAL SEALS AND METHOD FOR USING SAME

BACKGROUND OF THE INVENTION

1. Field of the Invention

The present invention pertains to an improved float sub for use in connection with oil and gas drilling operations including, without limitation, in vertical, horizontal and/or directional well bores. More particularly still, the present invention pertains to a float sub including at least one float valve assembly that does not comprise or utilize sealing elements constructed of rubber or synthetic elastomeric materials.

2. Description of Related Art

During the drilling of oil and/or gas wells, drilling rigs and associated equipment can be used to manipulate and move tubular goods (including, without limitation, drill pipe, casing and/or other tubulars) into and out of wellbores that extend into subterranean strata. For example, drill bits and/or other down hole equipment are typically conveyed into a wellbore and maneuvered within said wellbore using a tubular work string made up of a plurality of individual sections of drill pipe (frequently called "joints"). The individual joints are joined in end-to-end relationship at said drilling rig and installed in a wellbore until a pipe string (known as a "drill string") is formed having a desired length.

Various fluids, commonly referred to as drilling mud and/or drilling fluids, are often pumped into a through-bore of said pipe string during well drilling and/or completion operations. The drilling mud typically exits at least one port or outlet near the distal end of the pipe string; the fluid is then circulated back to the earth's surface through the annular space formed between the exterior of the drill string and the interior of the surrounding wellbore. In certain circumstances, such drilling fluid can be "reverse" circulated. In such cases, the fluid flows from said annular space, through said at least one port or outlet (in the opposite direction from the example described above), and into the central through-bore of the pipe string.

Float subs have been used in connection with certain oil and gas drilling operations. Generally, float subs comprise a housing having at least one check or "float" valve disposed within said housing. Typically, a float sub comprising at least one spring biased check valve is positioned a predetermined distance (for example, one or two pipe sections or "joints") above the bottom or distal end of the drill string. Such float (check) valves typically remain in a normally-closed position.

When sufficient force acts on said check valve-typically via fluid pressure of drilling mud, cement or other fluid pumped down the inner bore of the drill string-said check valve opens, permitting pumped fluid to flow through said open check valve and out flow port(s) near the distal end of the drill string. Importantly, float valves prevent fluid flow in the opposite direction (that is, from the bottom of the drill string upward) through the central bore of the drill string. As such, float valves prevent drilling mud present in a wellbore from entering the drill string while said drill string is being lowered into said wellbore. Put another way, the float valve allows the drill string to "float" during its descent into a well. During cementing operations, when cement is pumped down the central through-bore of the drill string and out the distal end of the drill string, float valve(s) also prevent unwanted backflow of cement into the central bore of the pipe string.

Fluid flow through a float valve is controlled by forces acting on a biased sealing member movably positioned within a float valve body. At least one spring biases said valve sealing member in a closed and sealed relationship against a seat on the interior surface of the float valve body. When a predetermined force (acting in the direction of the lower or distal end of the drill string) overcomes said biasing force, said valve sealing member will at least partially open and permit fluid to flow through said valve. It is to be understood that a float valve constitutes a restriction to flow within the inner bore of a drill string. This restriction can impact the functionality of the drilling operation and can create wear on those parts of the float valve exposed to fluid flow.

Conventional float valves utilize fluid pressure seals (such as O-rings and bushings) constructed of rubber or—more commonly in current operations-synthetic elastomeric materials. These conventional fluid pressure seal members work well in "normal" conditions. However, over time, many significant improvements have been made to drilling operations and capabilities; as such, long-reach lateral and horizontal wells are currently being drilled in ever-more challenging environments. As a result, many float valves are exposed to extremely high temperatures, high pressures and/or exotic drilling muds and additives. In many cases, such rubber and synthetic elastomeric materials suffer from poor performance-if not outright catastrophic failure—in such challenging high-temperature and/or high-pressure environments.

Those skilled in the art would recognize that failure of a float valve can have significant adverse consequences on drilling operations. Any failed equipment in a drill string typically requires that the drill string be removed from a well bore, the failed equipment be repaired or replaced, and the entire assembly be re-installed in the well bore. This typically interferes with ongoing drilling operations and leads to additional costs. In extreme cases, a failing float valve can result in highly unsafe conditions, potentially causing death, personal injury and/or catastrophic damage to property.

Thus, there is a need for a float sub having at least one float valve that does not utilize fluid pressure seals (such as O-rings and bushings) constructed of rubber or synthetic elastomeric materials. The improved float valve should comprise metal-to-metal seals within said float sub, thereby making the float valve(s) less likely to fail, even in challenging environments having extremely high temperatures, high pressures and/or damaging drilling muds and additives.

SUMMARY OF THE INVENTION

The present invention comprises a method and apparatus for controlling downhole pressure in a drill string. In a preferred embodiment, the present invention comprises a plurality of float valve assemblies that can be beneficially arranged in a desired configuration. In one common arrangement, said float valve assemblies of the present invention can be arranged in a combination of at least two stacked float valve assemblies, comprising first (upper) and second (lower) float valve assemblies installed within a central flow bore of at least one tubular carrier member.

Each float valve assembly comprises an interchangeable float assembly body apparatus which, in turn, generally comprises a housing with center brace, a sealing dart and a shaped dart shaft movably received within a dart shaft guide. A heavy-duty spring biases said sealing dart in a closed position as detailed more fully herein. Said housing can be investment cast in a single unit comprising center brace unit and dart shaft guide. Further, said sealing dart, when in a normally-closed position, can cooperate with an opposing seat surface to form an internal metal-to-metal seal.

Each housing can be machined or otherwise manufactured with a thread having desired dimensions (such as, for example, 3.5 12P UN V) to form a housing threaded seal. Moreover, each such housing can be heat treated in the presence of carbon monoxide to carburize the surface for additional hardness and wear resistance; said heat treatment can beneficially result in a hardness rating of at least 55 Rockwell.

In one embodiment, a baffle sealing apparatus can be operationally attached to a float assembly (typically, an upper float valve assembly) body apparatus. Said baffle sealing apparatus can be machined or otherwise manufactured with a thread that matches the thread of said housing (such as, for example, 3.5 12P UN V) of said float assembly body apparatus. Further, said baffle sealing apparatus can also be machined or otherwise manufactured with an external thread (such as with a 4.00 12P UN V or 10P STUB ACME thread pattern) to mate with matching threads on the inner threaded sealing area of the metal tubular carrier. Said threaded baffle sealing unit can incorporate a baffle strainer comprising a plurality of arranged openings of varying sizes to trap and/or filter out foreign objects that can damage and/or render the float assembly inoperative.

In one embodiment, a seal housing is operationally attached to a float assembly (typically, a lower float valve assembly) housing and contains a plurality of precision seal channels that are configured to contain synthetic multi seals. Said synthetic multi seals can comprise rigid temperature and pressure resistant materials such as, for example, solid PTFE (Teflon), Polyether Ether Ketone (PEEK) and Para-Aramid (KEVLAR). Said synthetic multi seals can be molded or machined to closely fit within the precision seal channels of said seal housing and can be relieved on a 16-degree bias to facilitate installation. Said bias relief can be beneficially installed in a staggered arrangement to maintain positive seal.

The present invention, and particularly the aforementioned metal-to-metal seals formed therein provide an especially important mechanism, particularly when used in connection with managed pressure drilling (MPD) technique(s) employed during the drilling of horizontal well lateral sections. The MPD drilling technique is a method for maintaining pressure on the anulus of a well bore to maintain the integrity of said well bore walls while adding drill pipe to a drill string (making a connection) or removing a section of drill pipe from the drill string (tripping out of the hole). During such operations it is imperative that downhole float valve assemblies remain intact in order to prevent uncontrolled backflow of drilling fluids in the drill string.

It is the standard procedure many operators of drilling rigs to utilize multiple conventional float valves with synthetic elastomeric polymers with seals of different material makeup. With excessive down hole temperatures (frequently approaching 400+F), increasing pump pressures for drilling fluids used to remove hole cuttings to the surface, and back pressure from MPD operations, conventional "synthetic rubber" seals prematurely fail from excessive heat, wear, and chemical degradation from oil base mud additives and carbon dioxide ($CO_2$), hydrogen sulfide ($H_2S$), and methane gases from the well bore. The metal-to-metal seals formed by the float valve assemblies and the tubular carrier of the present invention forms an impervious fluid pressure seal.

BRIEF DESCRIPTION OF THE ANNOTATED DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

Further, the drawings constitute a part of this specification and include exemplary embodiments of the invention. It is to be understood that in some instances, various aspects of the invention may be shown exaggerated or enlarged to facilitate an understanding of the invention. Therefore, the drawings may not be to scale.

DETAILED DESCRIPTION OF A PREFERRED EMBODIMENT OF THE INVENTION

Before describing various embodiments of the present disclosure in further detail by way of exemplary description, examples, and results, it is to be understood that the apparatus and methods of the present disclosure are not limited in application to the details of specific embodiments and examples as set forth in the following description. The description provided herein is intended for purposes of illustration only and is not intended to be construed in a limiting sense. As such, the language used herein is intended to be given the broadest possible scope and meaning, and the embodiments and examples are meant to be exemplary, not exhaustive. Also, it is to be understood that the phraseology and terminology employed herein is for the purpose of description only and should not be regarded as limiting unless otherwise indicated as so. Moreover, in the following detailed description, numerous specific details are set forth in order to provide a more thorough understanding of the present disclosure.

It will be apparent to a person having ordinary skill in the art that the present disclosure may be practiced without these specific details. In other instances, features which are well known to persons of ordinary skill in the art have not been described in detail to avoid unnecessary complication of the description. It is intended that all alternatives, substitutions, modifications, and equivalents apparent to those having ordinary skill in the art are included within the scope of the present disclosure. Thus, while the apparatus and methods of the present disclosure have been described in terms of particular embodiments, it will be apparent to those of skill in the art that variations may be applied to the apparatus and methods and the steps or in the sequence of steps of the methods described herein without departing from the concept, spirit, and scope of the inventive concepts.

Figure 1:
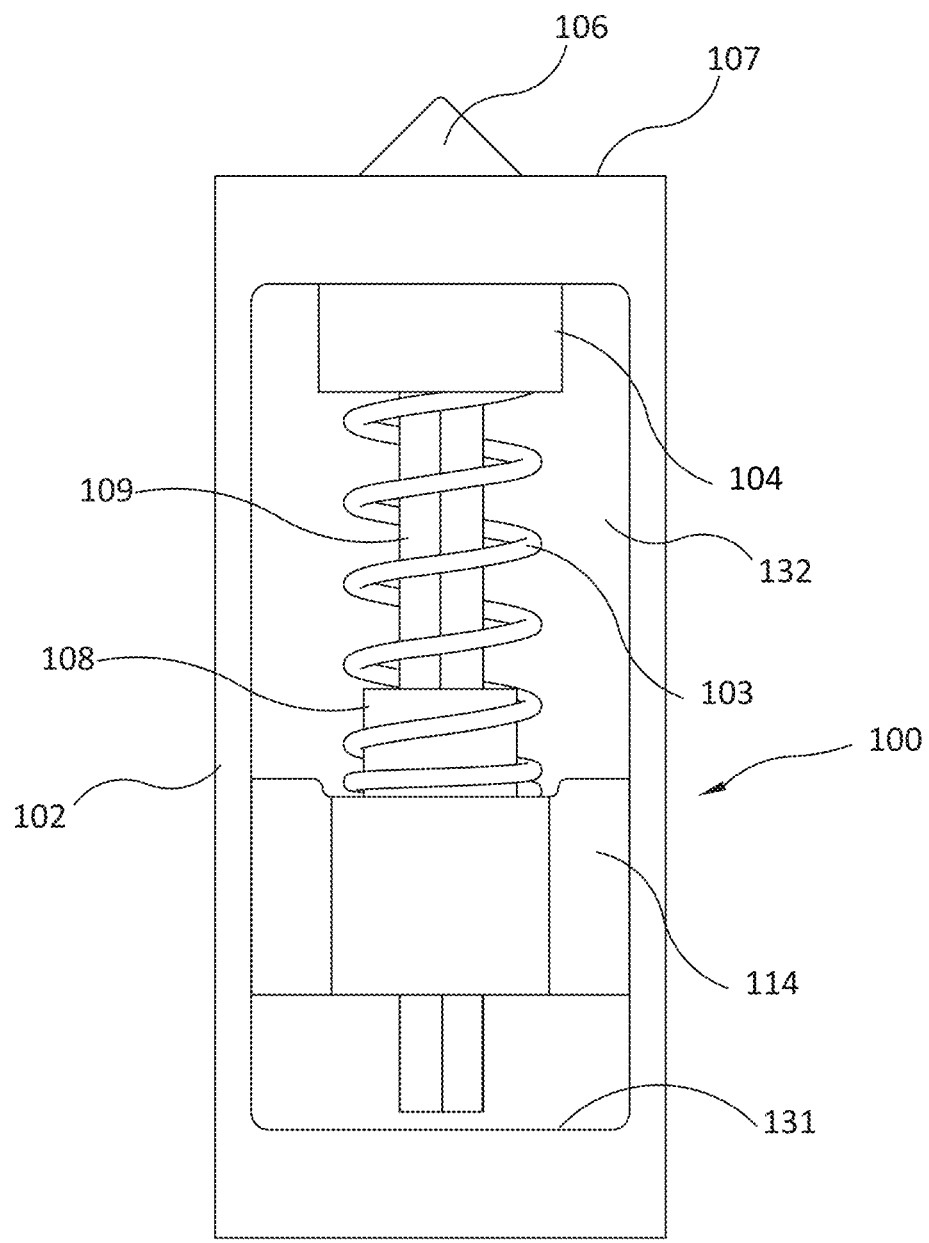
FIG. 1 depicts a side view of a float valve body assembly of the present invention.

In a preferred embodiment, the present invention comprises a float valve system for controlling pressure in a drill string comprising some combination of first (upper) and second (lower) float valve assemblies, as described more fully herein. FIG. 1 depicts a side view of a float valve body assembly 100 of the present invention. Said float valve body assembly 100 generally comprises substantially cylindrical housing 102 having at least one side opening defining window 131 that permits easy access to central bore 132 of said housing member 102.

Center brace member 114 and dart shaft guide 108 are disposed in said central bore 132 of housing member 102. Shaped dart shaft 109 is movably disposed within said dart shaft guide 108; in a preferred embodiment, said shaped dart shaft 109 has three sides defining a triangular cross section. Bias spring 103 is generally disposed between center brace 114 and spring shield 104 in in said central bore 132 of housing member 102; in the embodiment depicted in FIG. 1, said bias spring 103 comprises a coil spring, with dart shaft 109 disposed through the central opening along the longitudinal axis of said bias spring 103. Sealing dart 106 extends beyond upper end surface 107 of housing member 102 and is biased by bias spring 103.

Figure 2:
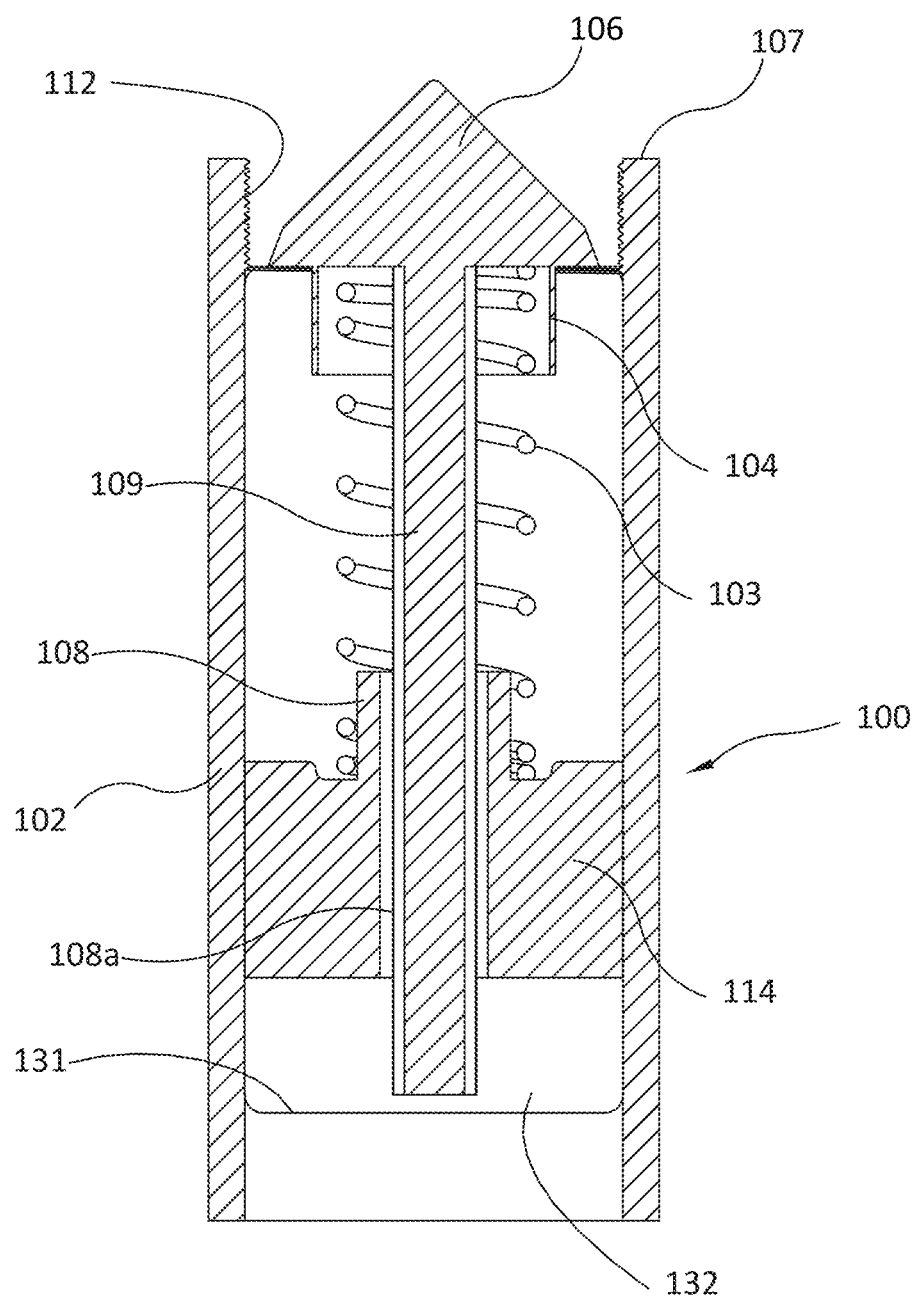
FIG. 2 depicts a side sectional view of a float valve body assembly of the present invention.

FIG. 2 depicts a side sectional view of a float valve body assembly 102 of the present invention. Said housing member 102 has a substantially cylindrical shape having at least one window 131 opening into central bore 132 of said housing member 102. Center brace member 114 and dart shaft guide 108 are disposed in said central bore 132 of housing member 102. Shaped dart shaft 109 is movably disposed within through bore 108a of said dart shaft guide 108. Bias spring 103 is disposed between center brace 114 and spring shield 104, while dart shaft 109 is disposed through the central longitudinal opening of said coil bias spring 103.

Female threads 112 are disposed on the inner surface of said lower housing 102. Although other thread configurations can be used without departing from the scope of the present invention, said female threads 112 can comprise 3.5 12P UN V threads. Dart shaft 109 having triangular cross section is moveably disposed within central bore 108a of dart shaft guide 108, while sealing dart 106 extends beyond upper end surface 107 of housing member 102 and is acted upon by bias spring 103.

Figures 3, 4:
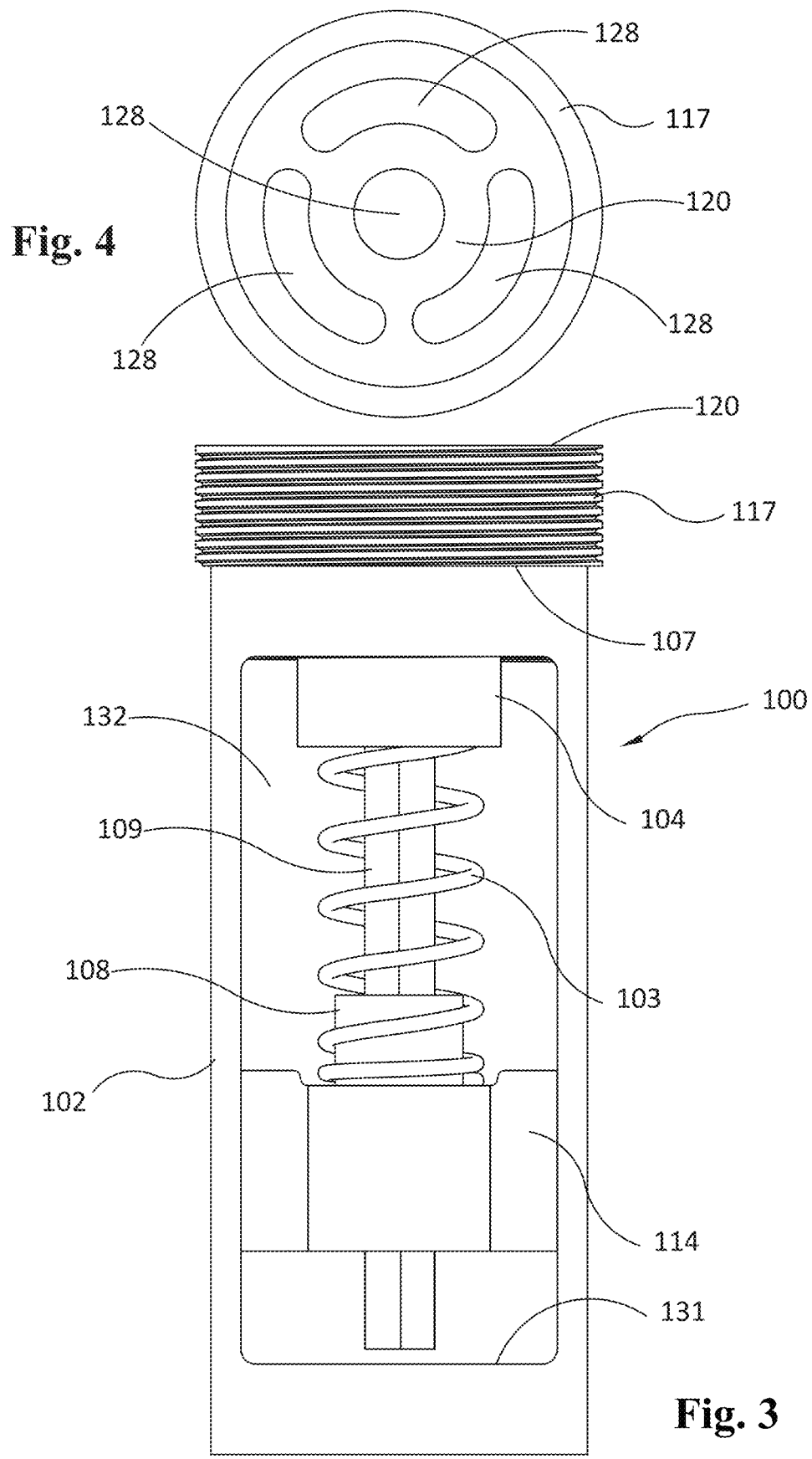
FIG. 3 depicts a side view of a float valve assembly of the present invention with an upper baffle sealing member installed.
FIG. 4 depicts an end view of said upper threaded baffle sealing member of said float valve assembly of the present invention.

FIG. 3 depicts a side view of a float valve assembly 100 of the present invention with an upper baffle sealing member 120 installed. Said float valve assembly 100 generally comprises cylindrical housing 102 having central bore 132. Center brace member 114 and dart shaft guide 108 are disposed in said central bore 132. Shaped dart shaft 109 is movably disposed within said dart shaft guide 108; in a preferred embodiment, said shaped dart shaft 109 has three sides defining a triangular cross section. Bias spring 103 is generally disposed between center brace 114 and spring shield 104. Threaded baffle strainer member 120 having external threads 117 is operationally attached to housing 102.

Said housing member 102 can be investment cast in a single unit comprising center brace member 114 and dart shaft guide 108. Threaded baffle strainer member 120 disposed near the upper end 107 of said housing 102 can be machined with an external connection thread 117 having desired dimensions (such as, for example, 3.5 12P UN V). Said housing 102 can also be beneficially heat treated in the presence of carbon monoxide to carburize the surface of said housing 102 for additional hardness and wear resistance; said heat treatment can beneficially result in a hardness rating of at least 55 Rockwell.

FIG. 4 depicts an end view of a threaded baffle strainer member 120 of said float valve assembly 100 of the present invention. Said threaded baffle strainer member 120 can comprise a plurality of openings 128 of varying shapes, sizes and orientations that extend through said baffle strainer 120. When installed on said float valve assembly 100, said openings 128 of said baffle strainer 120 act to trap and/or filter out foreign objects that can damage and/or render said first or upper float assembly 100 (and, more specifically, components within central bore 132) inoperative. External connection threads 117 can be disposed along the outer surface of said threaded baffle strainer member 120.

Figure 5:
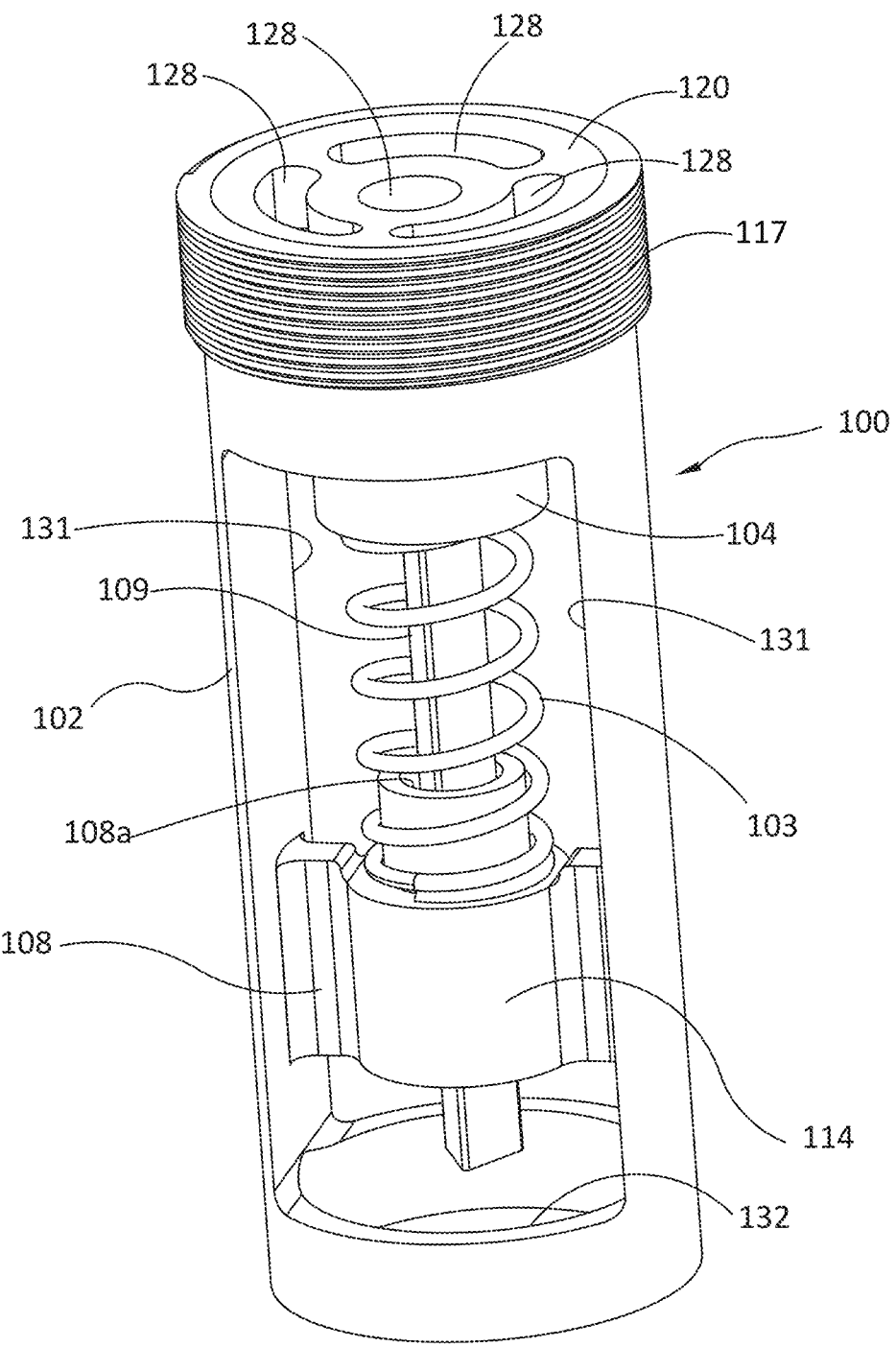
FIG. 5 depicts a side perspective view of said float valve assembly of the present invention with said upper baffle sealing member installed.

FIG. 5 depicts a side perspective view of said float valve assembly 100 of the present invention. Said float valve assembly 100 generally comprises housing member 102 having a substantially cylindrical shape. Side openings define windows 131 that permit easy access to central bore 132 of said housing member 102. Center brace member 114 and dart shaft guide 108 are disposed in said central bore 132 of housing member 102.

Shaped dart shaft 109 is movably disposed within central bore 108a of said dart shaft guide 108; in a preferred embodiment, said shaped dart shaft guide 109 has three sides defining a triangular cross section. Bias spring 103 is generally disposed between center brace 114 and spring shield 104, while threaded baffle strainer member 120 is operationally attached to housing 102. Threaded baffle strainer member 120 has a plurality of concentric openings 128, while external connection threads 117 are disposed along the outer surface of said threaded baffle strainer member 120.

Figure 6:
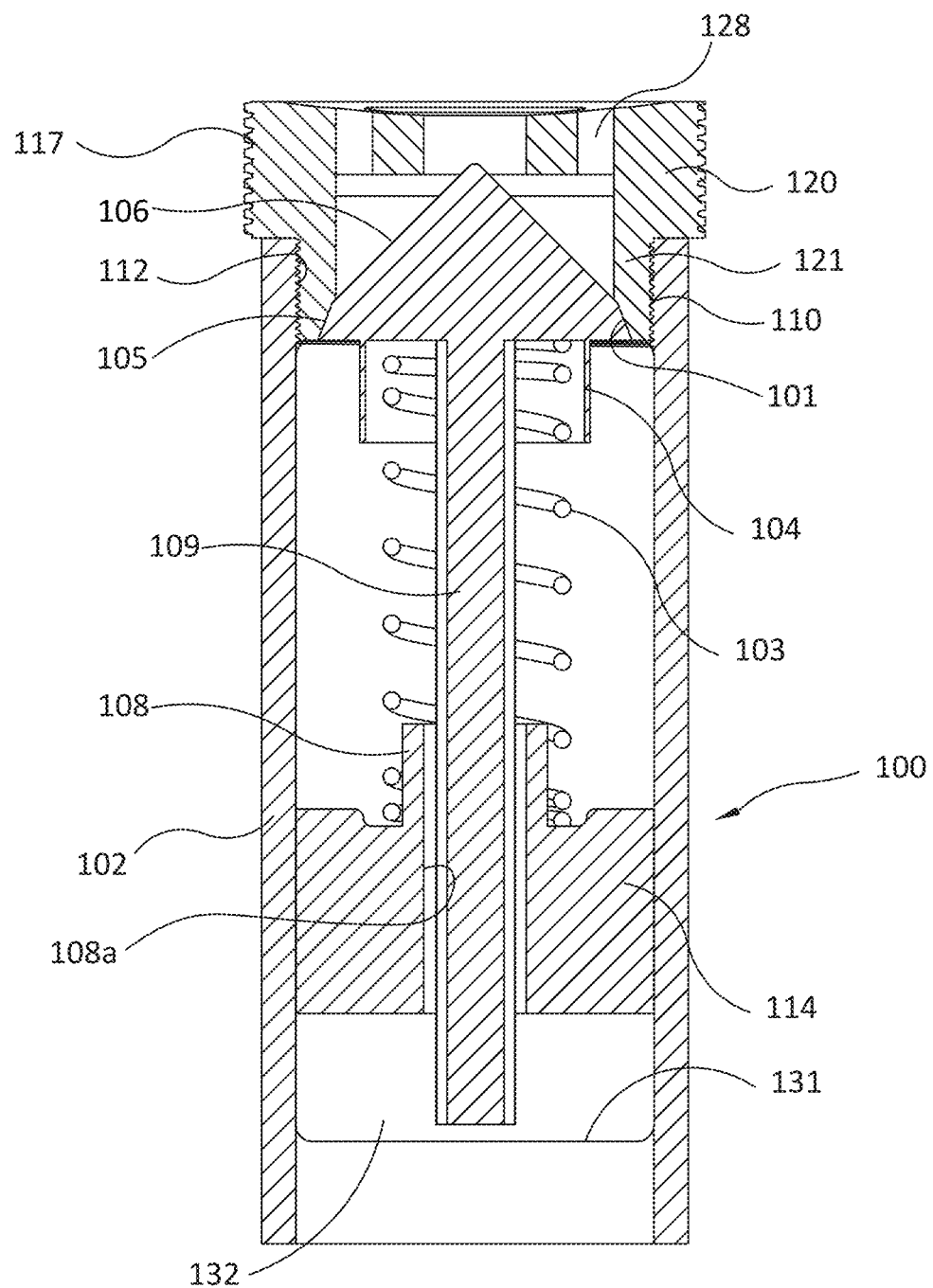
FIG. 6 depicts a side sectional view of said float valve assembly of the present invention with said upper baffle sealing member installed.

FIG. 6 depicts a side sectional view of float valve assembly 100 of the present invention. Referring to FIG. 6, said housing member 102 can have a substantially cylindrical shape having side openings defining windows 131 into central bore 132 of said housing member 102. Center brace member 114 and dart shaft guide 108 are disposed in said central bore 132 of housing member 102. Shaped dart shaft 109 is movably disposed within through bore 108a of said dart shaft guide 108; in the embodiment depicted in FIG. 6, said shaped dart shaft 109 has three sides defining a triangular cross section. Bias spring 103 is generally disposed between center brace 114 and spring shield 104.

Threaded baffle strainer member 120 is operationally attached to housing 102 at upper end 107 thereof. In a preferred embodiment depicted in FIG. 6, said threaded baffle strainer member 120 comprises lower extension member 121 having external male threads 110. Said external threads 110 can engage and mate with opposing female threads 112 disposed on the inner surface of lower housing 102, thereby forming a metal-to-metal fluid pressure seal between said threaded baffle strainer member 120 and housing 102. Threaded baffle strainer member 120 can comprise a plurality of openings 128 that extend through said baffle strainer member 120, while external connection threads 117 are disposed along the outer surface of said threaded baffle strainer member 120.

Said external male threads 110 can be machined with a matching thread (such as, for example, 3.5 12P UN V) to mate with opposing female threads 112 disposed on the inner surface of lower housing 102 to form a metal-to-metal fluid pressure seal. Additionally, said external connection threads 117 along the outer surface of baffle strainer member 120 can be machined (such as with a 4.00 12P UN V or 10P STUB ACME thread pattern) to mate with a matching thread pattern along an inner threaded sealing area of a tubular carrier to form another metal-to-metal fluid pressure seal described more fully herein.

Triangular dart shaft 109 is moveably disposed within central bore 108a of dart shaft guide 108. Sealing dart 106 is biased in a normally closed position by bias spring 103; in this closed position, tapered external sealing surface 105 of said sealing dart 106 engages with and forms an internal metal-to-metal seal against opposing tapered internal sealing surface 101 of threaded baffle strainer member 120 and, more specifically, extension 121 thereof.

Figure 7:
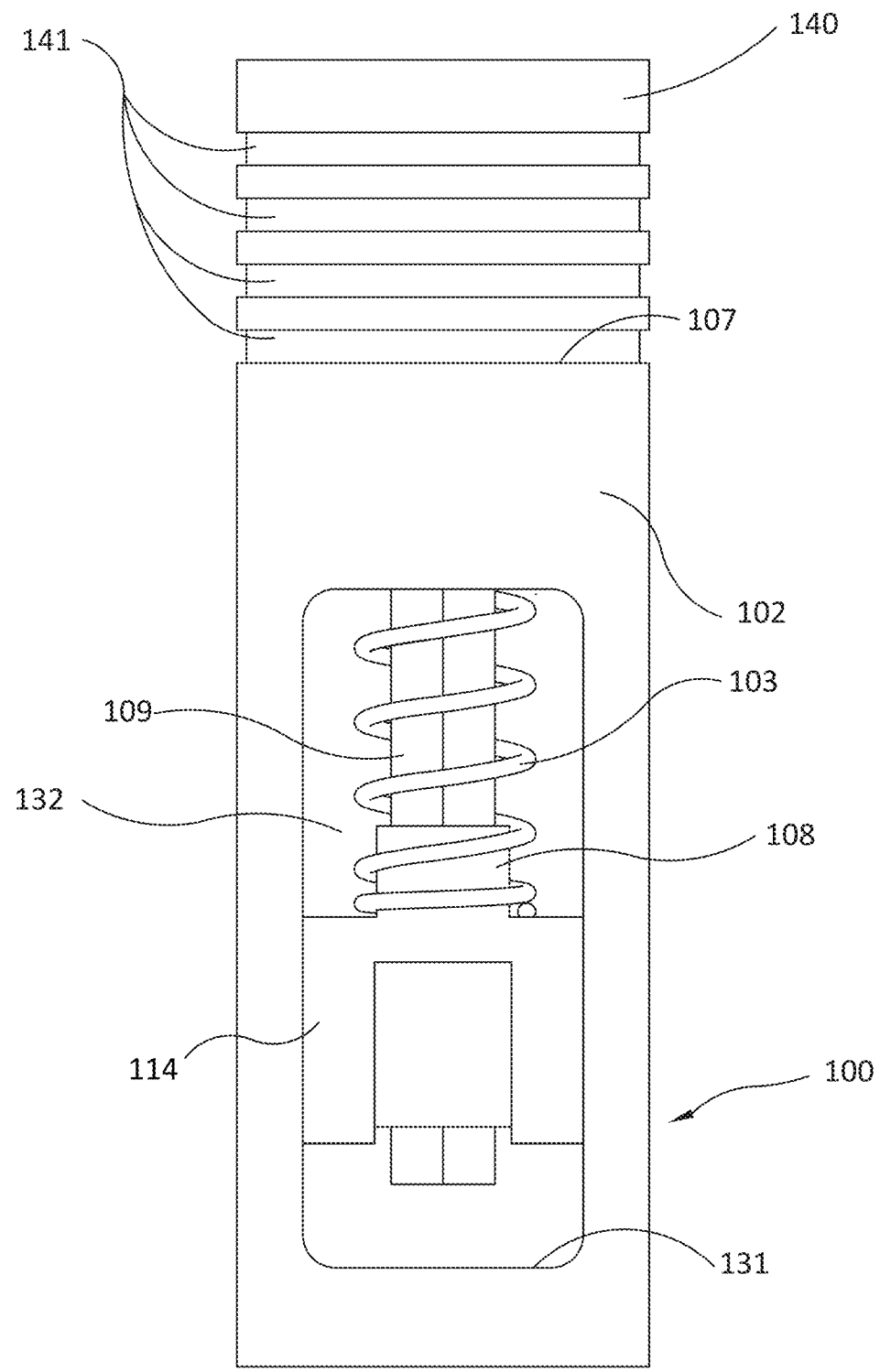
FIG. 7 depicts a side view of a float valve assembly of the present invention with a seal assembly (but no external sealing members) installed.

FIG. 7 depicts a side view of a float valve assembly 100 of the present invention with a seal assembly 140 (but no external sealing members) installed. Said float valve assembly 100 generally comprises a housing 102 having center brace member 114 and dart shaft guide 108. Said housing member 102 has a substantially cylindrical shape having at least one side opening defining window 131 that permits easy access to central bore 132 of said housing member 102. Shaped dart shaft 109 is movably disposed within said dart shaft guide 108, while bias spring 103 is disposed on center brace 114.

Seal housing 140 is operationally attached to housing member 102; in a preferred embodiment, said seal housing 140 is operationally attached to housing member 102 at upper end 107 thereof. Said seal housing 140 comprises a plurality (4 in the example depicted) of precision seal channels 141 that extend around the circumference of said upper seal housing 140 and are oriented substantially parallel to each other (and perpendicular to the longitudinal axis of housing member 102. Said precision seal channels 141 are configured to receive seal members. It is to be observed that more or less than four (4) precision seal channels 141 can be employed without departing from the scope of the present invention.

Figures 8, 9, 10:
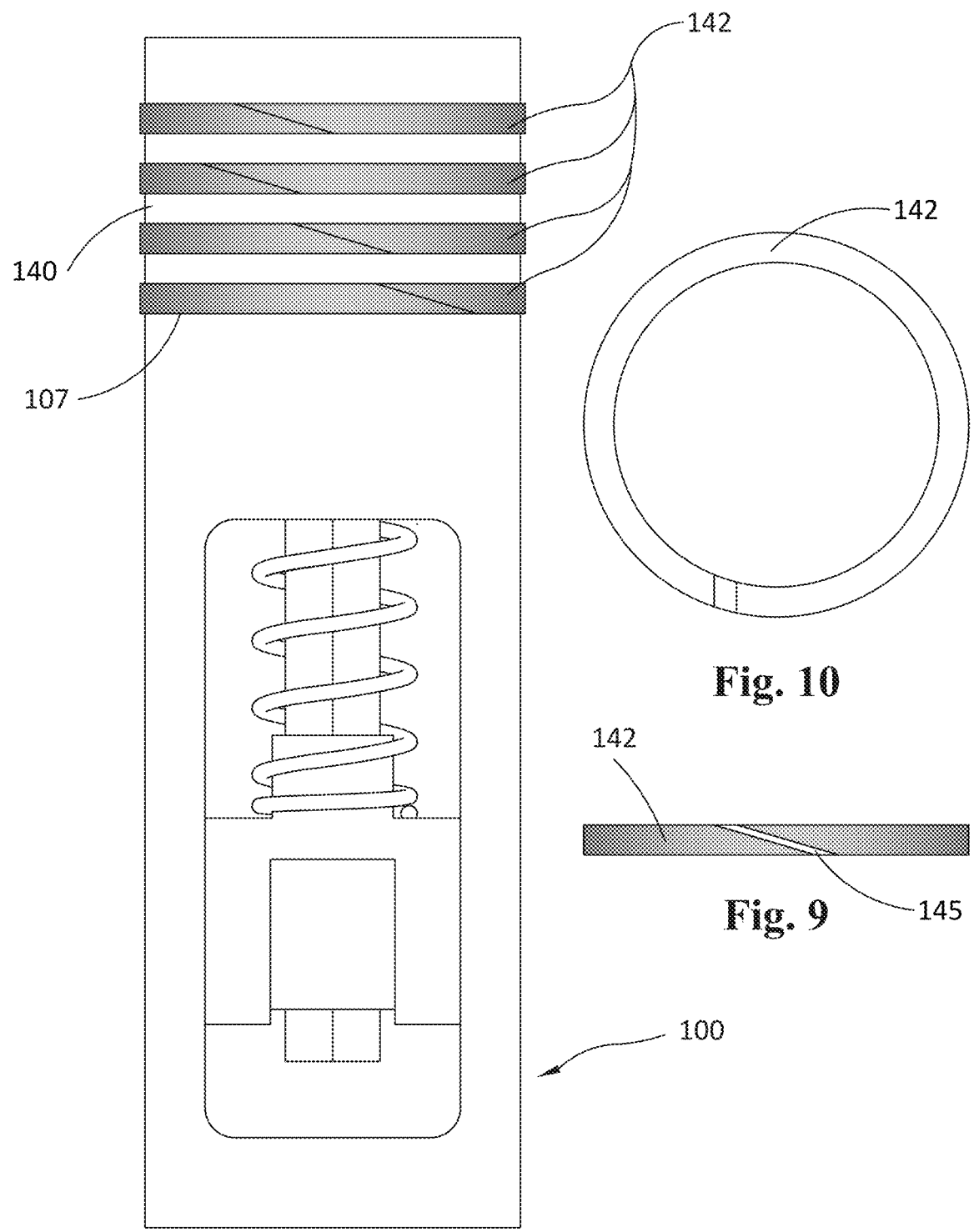
FIG. 8 depicts a side view of a float valve assembly of the present invention with a seal assembly and external sealing members installed.
FIG. 9 depicts a side view of an external sealing member of the present invention.
FIG. 10 depicts a top view of an external sealing member of the present invention.

FIG. 8 depicts a side view of a float valve assembly 100 of the present invention with a seal housing 140 and external sealing members 142 installed. Seal housing 140 is operationally attached to housing 102 at upper end 107 thereof. Although not visible in FIG. 8, it is to be observed that seal housing 140 can comprise external threads 110 that can engage and mate with opposing female threads 112 disposed on the inner surface of lower housing 102 (visible in FIG. 6), thereby forming a metal-to-metal fluid pressure seal between said seal housing 140 and housing 102. A plurality of precision seal members 142 are received within parallel seal channels 141 (depicted in FIG. 5) around the circumference of said upper seal housing 140.

FIG. 9 depicts a side view of an external sealing member 142 of the present invention, while FIG. 10 depicts a top view of an external sealing member 142. In a preferred embodiment, said synthetic multi precision seal members 142 can be constructed from rigid temperature and pressure resistant materials such as, for example, Solid PTFE (marketed under the brand name Teflon"), Polyether Ether Ketone (PEEK) and Para-Aramid (marketed under the brand name "KEVLAR"). Said synthetic multi seal members 142 can be molded or machined to fit the precision seal channels 141 (best shown in FIG. 5) and can be relieved on a 16-degree bias relief 145 to facilitate installation. Said bias relief 145 is beneficially arranged in a staggered orientation in order to maintain positive seal.

As previously noted, the present invention, and particularly the aforementioned metal-to-metal seals, comprise an especially important mechanism used in the MANAGED PRESSURE DRILLING (MPD) technique used in connection with drilling of horizontal well lateral sections. As previously noted, the MPD technique involves applying fluid pressure on the anulus of a well bore to maintain the integrity of well bore walls while adding drill pipe to drill string (making a connection) or removing a joint of drill pipe or stand from the drill string (tripping out of the hole). During such operations it is imperative that downhole float valve(s) maintain a fluid pressure seal in order to prevent uncontrolled backflow of drilling fluids from the annulus through the drill string by the downhole pressure being created by the MPD operation.

Figure 11:
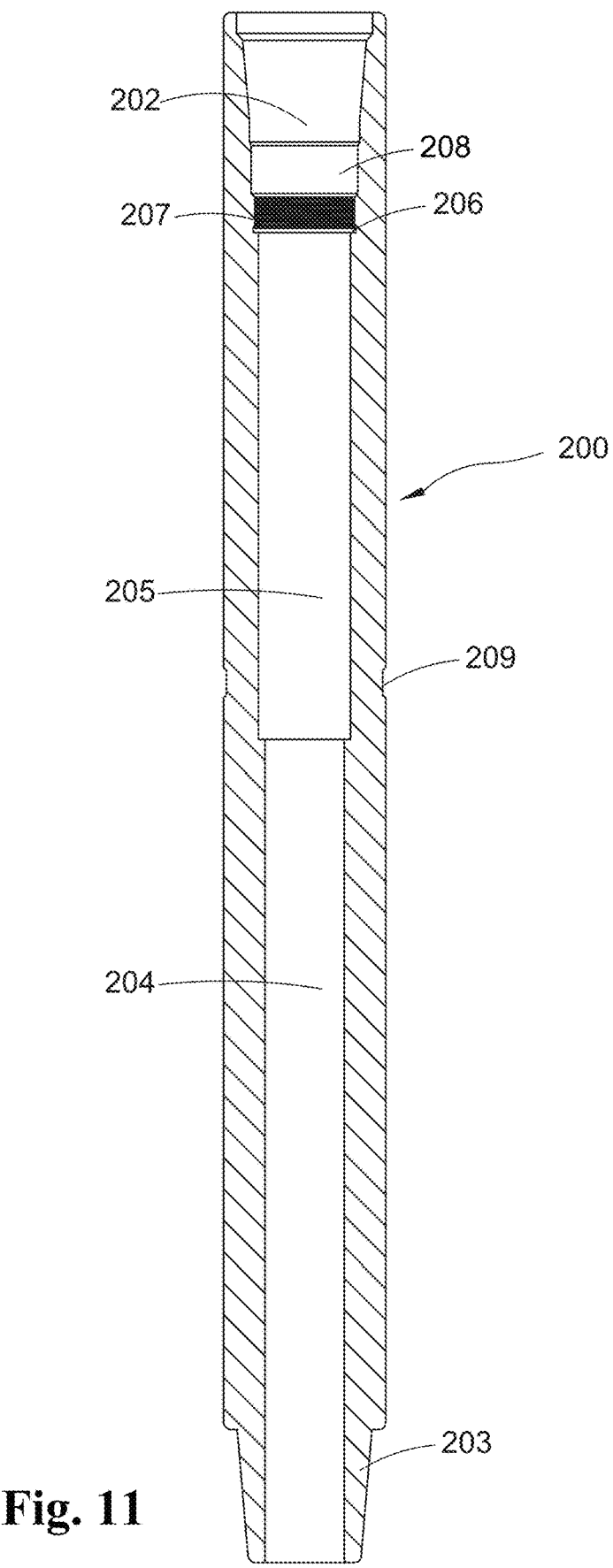
FIG. 11 depicts a side sectional view of a float sub housing of the present invention.

FIG. 11 depicts a side sectional view of a float carrier sub 200 of the present invention (with no float valve assemblies installed). Said tubular float carrier sub 200 comprises a metal tubular body member 201 of predetermined outside diameter (OD) and length, with a box end (female) threaded connection 202 and pin end (male) threaded connection 203. Tubular body member 201 has a centered through bore 204 extending from said box connection 202 to said pin connection 203; said through bore 204 includes precision bore section 205 to accommodate float valve assemblies, as more fully set forth herein, as well as band 209 along its internal diameter. Relief groove 206, inner threaded receiver 207 and repair allowance 208 are machined to predetermined specifications.

Figure 12:
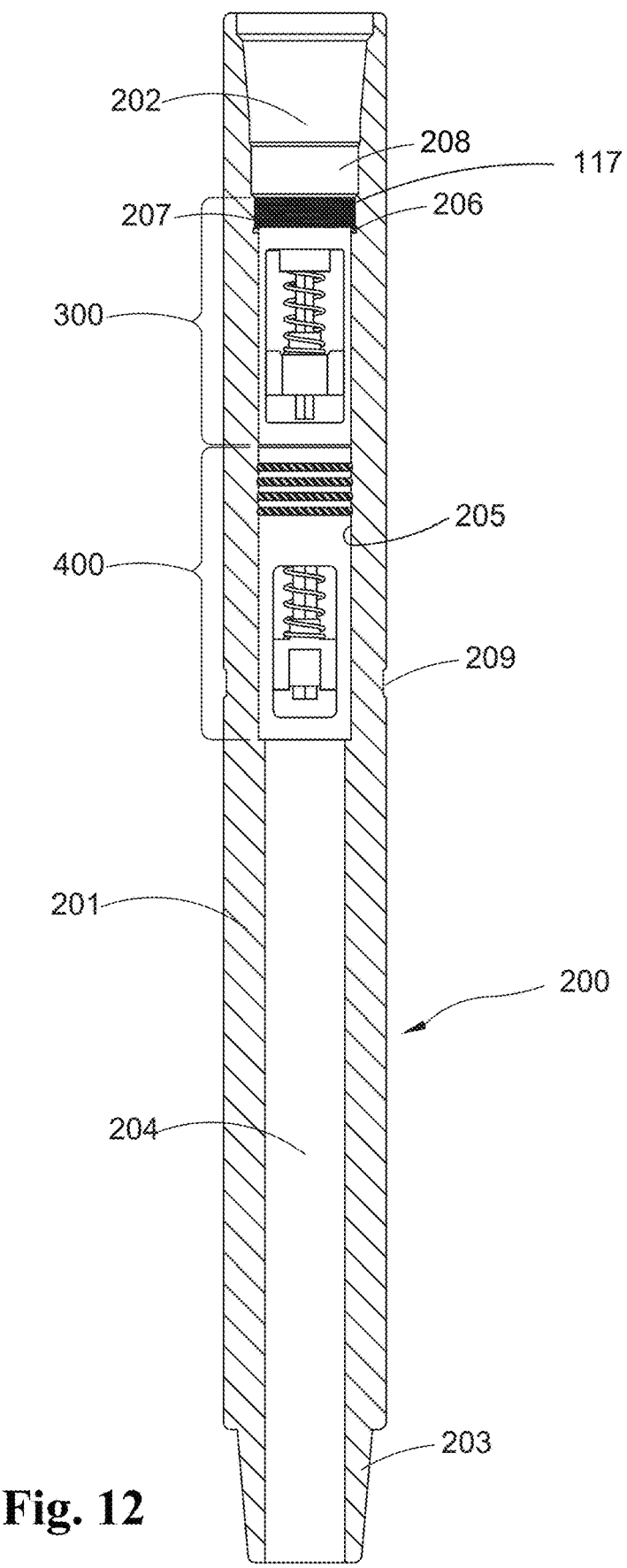
FIG. 12 depicts a side sectional view of a float sub of the present invention with first and second float valves installed.

FIG. 12 depicts a side sectional view of a float carrier sub 200 of the present invention with first (lower) float valve assembly 400 and second (upper) float valve assembly 300 installed. In the embodiment depicted in FIG. 12, it is to be observed that first (lower) float valve assembly 400 is configured in accordance with the float valve assembly depicted in FIG. 8, while said second (upper) float valve assembly 300 is configured in accordance with the float valve assembly depicted in FIG. 3.

Still referring to FIG. 12, said float carrier sub 200 generally comprises a first (lower) float valve assembly 400 that is inserted into precision bore 205 of float carrier sub 200 until seated. A second (upper) float assembly 300 is then lowered into said precision bore 205 of float carrier sub 200 until threads of inner threaded receiver 207 engage with external threads 117 (of baffle strainer member). Torques forces can be applied to said second (upper) float valve assembly 300 (ideally manually) to predetermined torque values. Said float carrier sub 200 (together with float valve assemblies 300 and 400) can be installed at a predetermined location within a drill string, such as depicted in FIG. 13.

Figure 13:
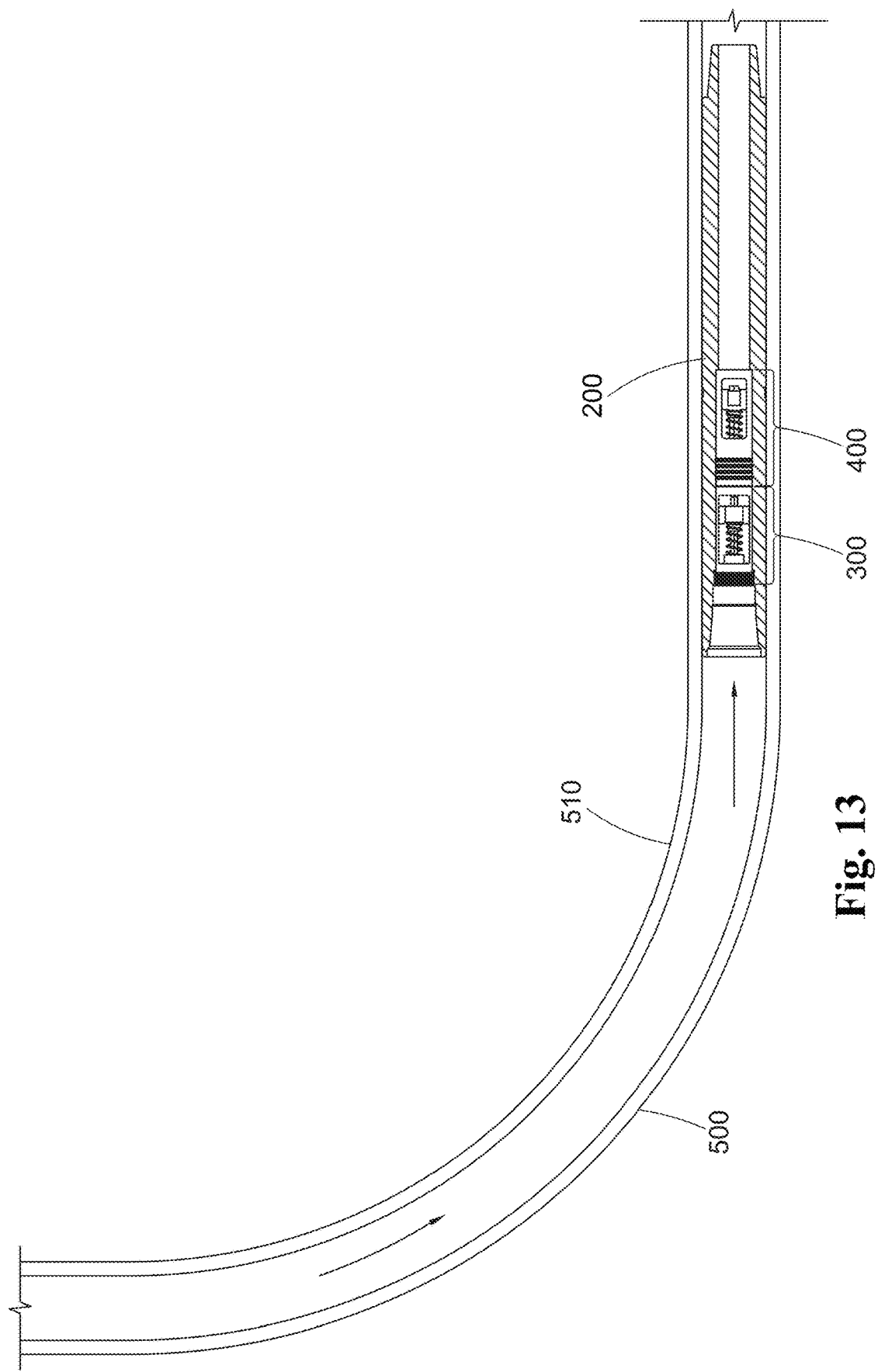
FIG. 13 depicts a side sectional view of the float sub, configured as depicted in FIG. 10, installed downhole within a subterranean wellbore.

FIG. 13 depicts a side sectional view of float carrier sub 200, configured as depicted in FIG. 12, installed downhole within a subterranean wellbore 500. Said float carrier sub 200 (as well as included float valve assemblies 300 and 400) can be conveyed to a desired depth within said subterranean wellbore 500 using tubular work string 510.

Drilling rig operators typically utilize multiple conventional float valves with synthetic elastomeric polymers with seals of different material makeup. With excessive down hole temperatures (frequently approaching 400+ F), increasing pump pressures for drilling fluids used to remove hole cuttings to the surface, and back pressure from MPD operations, conventional "synthetic rubber" seals prematurely fail from excessive heat, wear, and chemical degradation from oil base mud additives and CO2, H2S, methane and/or other gases from the well bore.

However, it is imperative that downhole float valve(s) remain intact to prevent uncontrolled backflow of drilling fluids being forced into the central flow bore of the drill string by the downhole pressure, particularly those created by the MPD operations. The metal-to-metal seal formed by second (upper) float valve assembly 300 and float carrier sub 200 forms metal-to-metal fluid pressure seal that is impervious to fluid flow. As such, fluid will not flow around float valve assemblies 300 and 400—that is, between the exterior of said float valve assemblies and the internal surface of bore 205 of float carrier sub 200. Further, a metal-to-metal seal prevents fluid from flowing through the interface between threaded baffle strainer member 120 and housing 102. Additionally, a fluid first (lower) float valve assembly 400 can utilize a plurality of solid synthetic seals (typically 4) disposed in stacked arrangement to further assist in control of back pressure.

Figure 15:
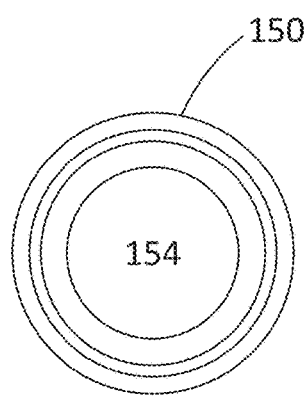
FIG. 15 depicts an end view of said second embodiment adapter member of the present invention.
Figure 17:
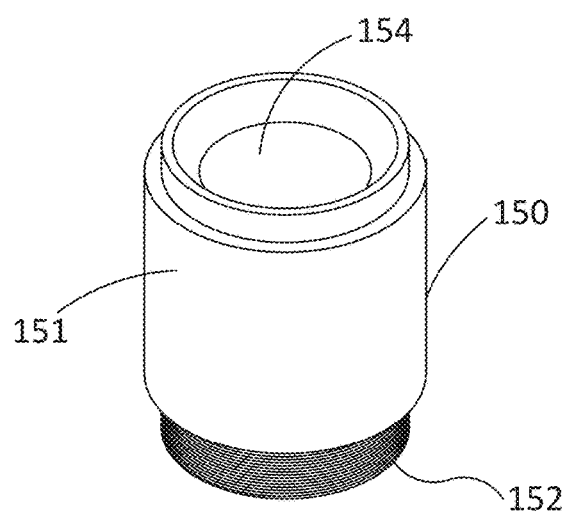
FIG. 17 depicts a side perspective view of said second embodiment adapter member of the present invention.
Figure 14:
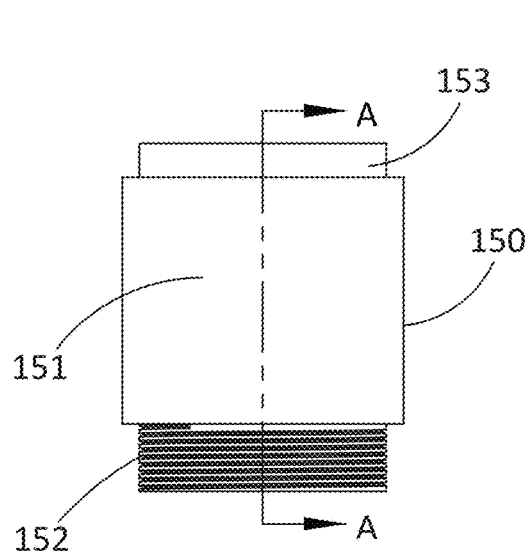
FIG. 14 depicts a side view of a second embodiment adapter member of the present invention.
Figure 16:
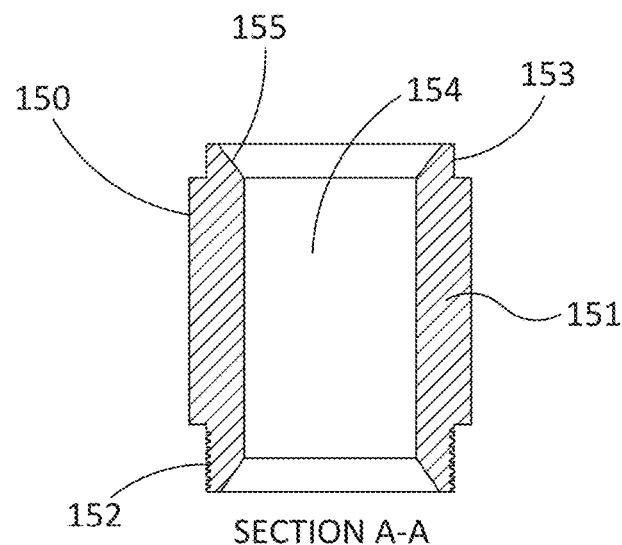
FIG. 16 depicts a side sectional view of said second embodiment adapter member of the present invention along line A-A of FIG. 14.

FIG. 14 depicts a side view of a second embodiment adapter member 150 of the present invention, while FIG. 15 depicts an end view of said second embodiment adapter member 150. FIG. 16 depicts a side sectional view of said second embodiment adapter member 150 along line A-A of FIG. 14, while FIG. 17 depicts a side perspective view of said second embodiment adapter member 150. Referring to FIG. 14 through 18, second embodiment adapter member 150 generally comprises central cylindrical body section 151, lower external threads 152, upper extension 153 (having tapered inner surface 155) and central through bore 154. Said external threads 152 can engage and mate with opposing female threads 112 disposed on the inner surface of a lower housing 102 (depicted, for example, in FIG. 2), thereby forming a metal-to-metal fluid pressure seal between said second embodiment adapter member 150 and a housing 102.

Figure 18:
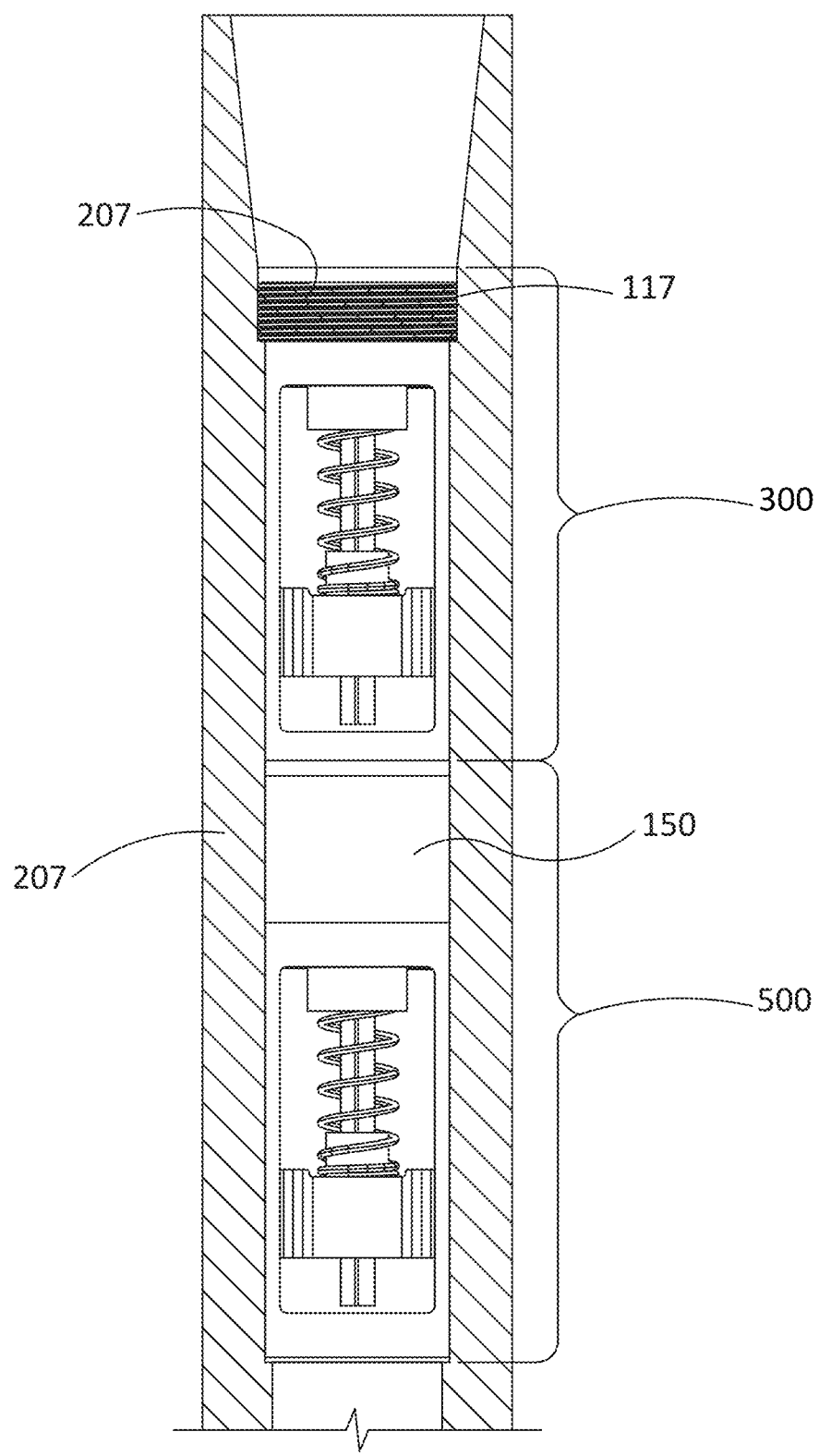
FIG. 18 depicts a side sectional view of a float sub with first and second float valves, as well as said second embodiment adapter member, installed.

FIG. 18 depicts a side sectional view of a float sub with first (lower) float valve assembly 500 and second (upper) float valve assembly 300; said second embodiment adapter member 150 is installed as part of first (lower) float valve assembly 500. Said float carrier sub 200 generally comprises a first (lower) float valve assembly 500 that is inserted into precision bore 205 of float carrier sub 200 until seated. A second (upper) float assembly 300 is then lowered into said precision bore 205 of float carrier sub 200 until threads of inner threaded receiver 207 engage with external threads 117 (of baffle strainer member). Said float carrier sub 200 (together with float valve assemblies 300 and 500) can be installed at a predetermined location within a drill string.

In operation, as depicted in FIG. 13, float carrier sub 200 (as well as included float valve assemblies 300 and 400) can be conveyed to a desired depth within a subterranean wellbore using tubular drill string or casing string. Said float carrier sub can be positioned a predetermined distance (for example, one or two pipe joints) above the bottom or distal end of the drill string or casing string.

Referring to FIG. 6, sealing dart 106 of float valve assembly 300 is biased in a normally closed position by bias spring 103; in this closed position, tapered external sealing surface 105 of said sealing dart 106 engages with and forms an internal metal-to-metal seal against opposing tapered internal sealing surface 101 of threaded baffle strainer member 120 and, more specifically, extension 121 thereof.

When sufficient predetermined force acts on said sealing dart 106—typically via fluid pressure of drilling mud, cement or other fluid pumped down the inner bore of the drill string-said bias spring 103 partially compresses, forcing said sealing surface 105 of sealing dart 106 to separate from sealing surface 101 and form an opening. Pumped fluid can flow through said opening; however, sealing dart 106 cooperates with sealing surface 101 to prevent fluid flow in the opposite direction. Referring to FIG. 12, said float valve assembly 300 is received within precision bore 205 of float carrier sub 200 until threads of inner threaded receiver 207 engage with external threads 117 (of baffle strainer member), thereby forming a metal-to-metal fluid pressure seal between said float valve assembly 300 and carrier sub 200.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. In the following description, numerous specific details are provided. One skilled in the relevant art will recognize, however, that the technology may be practiced without one or more of the specific details, or with other methods, components, materials, and so forth. In other instances, well-known structures, materials, or operations are not shown or described in detail to avoid obscuring aspects of the invention.

What is claimed:
1. A float valve assembly comprising:
  a) a first float valve comprising:
    i) a housing defining an inner space, a flow port, a seat and internal threads;
    ii) a dart member comprising a dart shaft and a dart head;
    iii) a spring configured to bias said dart head against said seat and close said flow port, wherein said dart head at least partially unseats and said flow port at least partially opens when a predetermined fluid pressure acts on said dart head and opposes said bias force applied by said spring;

iv) a baffle strainer member comprising first and second external threads, wherein said first external threads are configured to mate with said internal threads of said housing, and wherein said baffle strainer member is configured to filter out solid materials from passing through said flow port;

b) a tubular sub member configured to be conveyed into a wellbore in a tubular string, wherein said tubular sub member further comprises a central through bore and internal connection threads, and wherein said internal connection threads engage in mating relationship with said threads of said float valve to form a fluid pressure seal.

2. The float valve assembly of claim 1, wherein said dart head is substantially conical.

3. The float valve assembly of claim 2, wherein said seat is substantially circular.

4. The float valve assembly of claim 1, wherein said dart shaft has three sides.

5. The float valve assembly of claim 1, wherein said internal connection threads of said tubular sub member and said external threads of said housing form a metal-to-metal seal.

6. The float valve assembly of claim 1, further comprising a second float valve, wherein said second float valve comprises:

a) a second housing defining an inner space, a second flow port, a second seat and internal threads;

b) a second dart member comprising a second dart shaft and a second dart head;

c) a second spring configured to bias said second dart head against said second seat and close said second flow port, wherein said second dart head at least partially unseats and said second flow port at least partially opens when a predetermined fluid pressure acts on said second dart head and opposes said bias force applied by said second spring;

d) a seal member comprising external threads, wherein said first external threads are configured to mate with said internal threads of said second housing; and e) at least one seal member disposed around an external surface of said seal member.

7. The float valve assembly of claim 6, wherein said second dart head is substantially conical.

8. The float valve assembly of claim 7, wherein said second seat is substantially circular.

9. The float valve assembly of claim 6, wherein said second dart shaft has three sides.

10. The float valve assembly of claim 6, wherein said member and said external threads of said housing form a metal-to-metal seal.

11. A float valve assembly comprising:

a) a first float valve comprising:

i) a housing defining an inner space, a flow port, a seat and internal threads;

ii) a dart member comprising a dart shaft and a dart head;

iii) a spring configured to bias said dart head against said seat and close said flow port, wherein said dart head at least partially unseats and said flow port at least partially opens when a predetermined fluid pressure acts on said dart head and opposes said bias force applied by said spring;

iv) a baffle strainer member comprising first and second external threads, wherein said first external threads are configured to mate with said internal threads of said housing, and wherein said baffle strainer member is configured to filter out solid materials from passing through said flow port;

b) a second float valve, wherein said second float valve comprises:

i) a second housing defining an inner space, a second flow port, a second seat and internal threads;

ii) a second dart member comprising a second dart shaft and a second dart head;

iii) a second spring configured to bias said second dart head against said second seat and close said second flow port, wherein said second dart head at least partially unseats and said second flow port at least partially opens when a predetermined fluid pressure acts on said second dart head and opposes said bias force applied by said second spring;

iv) a seal member comprising external threads, wherein said first external threads are configured to mate with said internal threads of said second housing; and v) at least one seal member disposed around an external surface of said seal member;

c) a tubular sub member configured to be conveyed into a wellbore in a tubular string, wherein said tubular sub member further comprises a central through bore and internal connection threads, and wherein said internal connection threads engage in mating relationship with said threads of said float valve to form a fluid pressure seal.

\* \* \* \* \*